Oct. 27, 1942.  R. A. WILLIAMS  2,300,029

SORTING DEVICE FOR DUPLICATING MACHINES

Filed June 19, 1941  9 Sheets-Sheet 1

Inventor:
Robert Alonzo Williams
By Jubel, Carlson, Fitzbaugh & Wells
Attorneys.

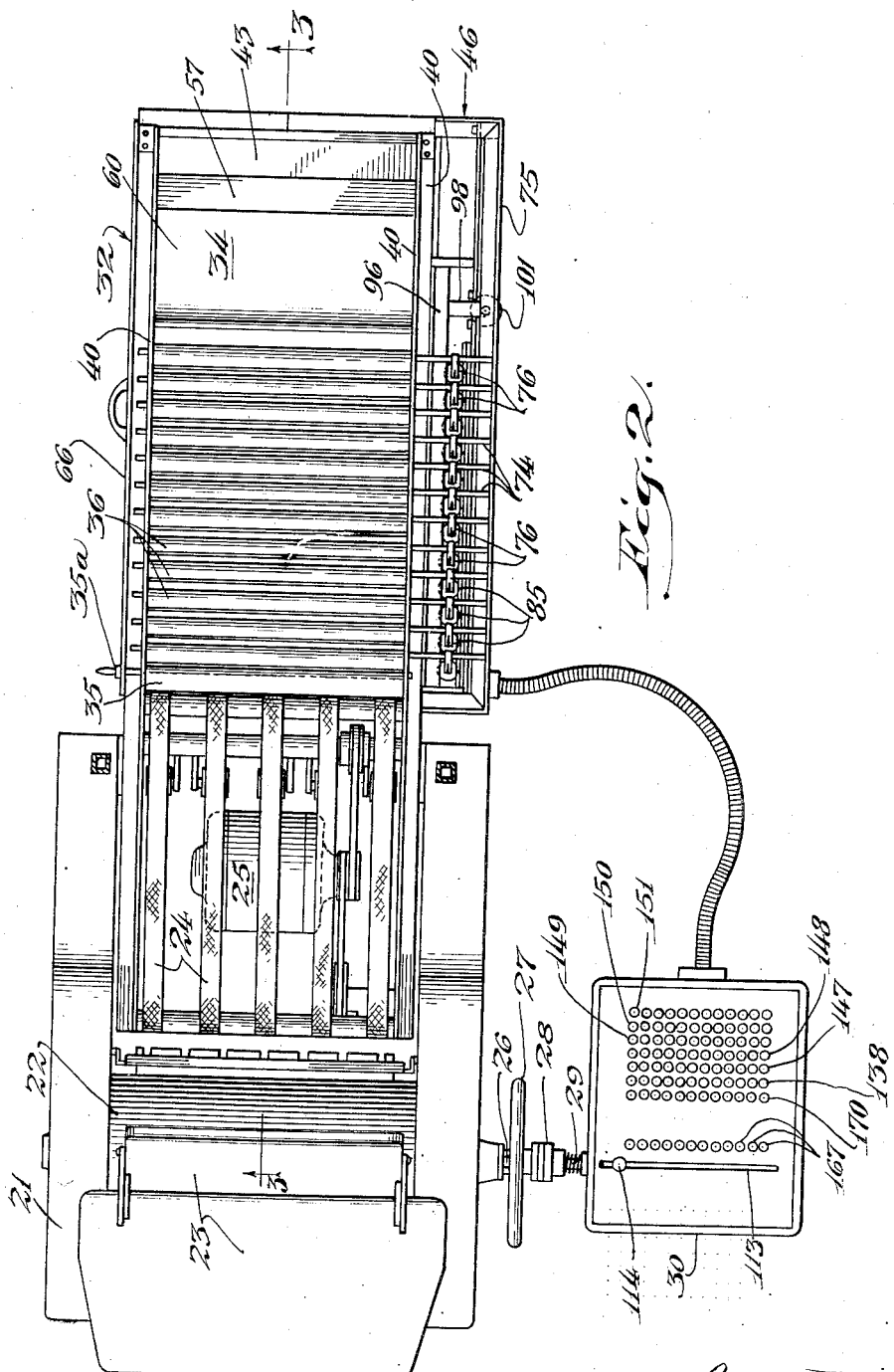

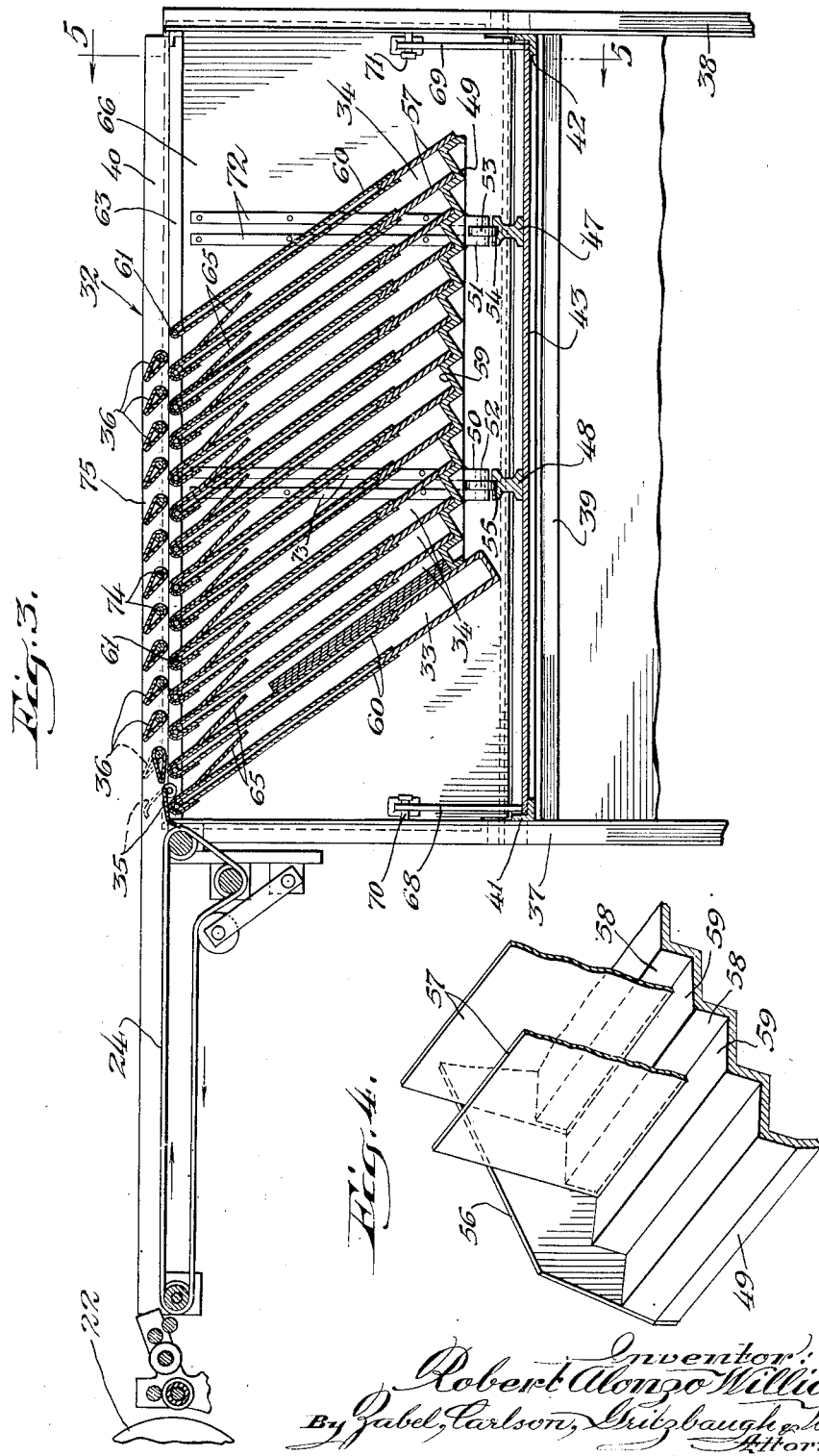

Oct. 27, 1942.  R. A. WILLIAMS  2,300,029
SORTING DEVICE FOR DUPLICATING MACHINES
Filed June 19, 1941  9 Sheets-Sheet 4
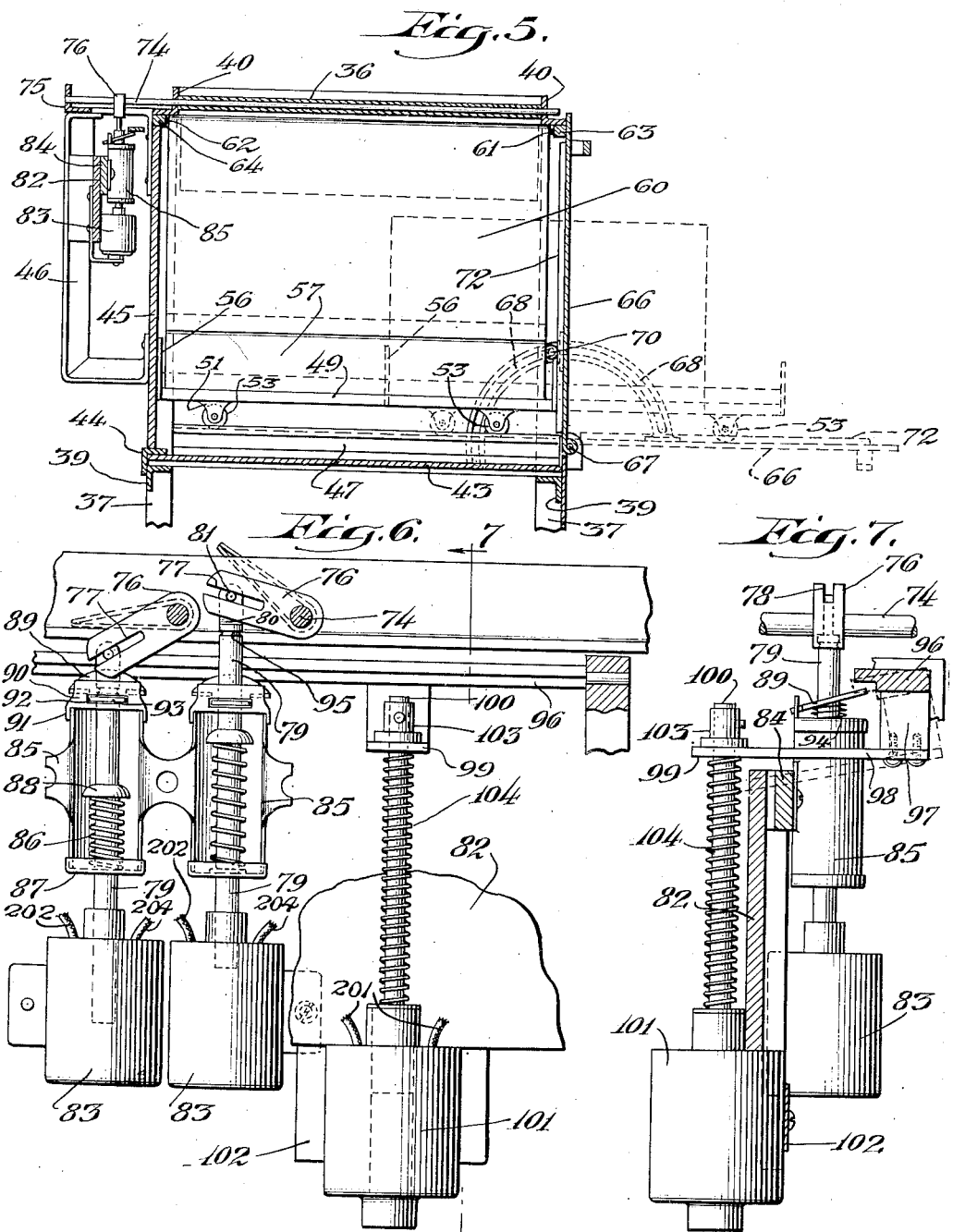

Oct. 27, 1942.  R. A. WILLIAMS  2,300,029
SORTING DEVICE FOR DUPLICATING MACHINES
Filed June 19, 1941    9 Sheets-Sheet 5
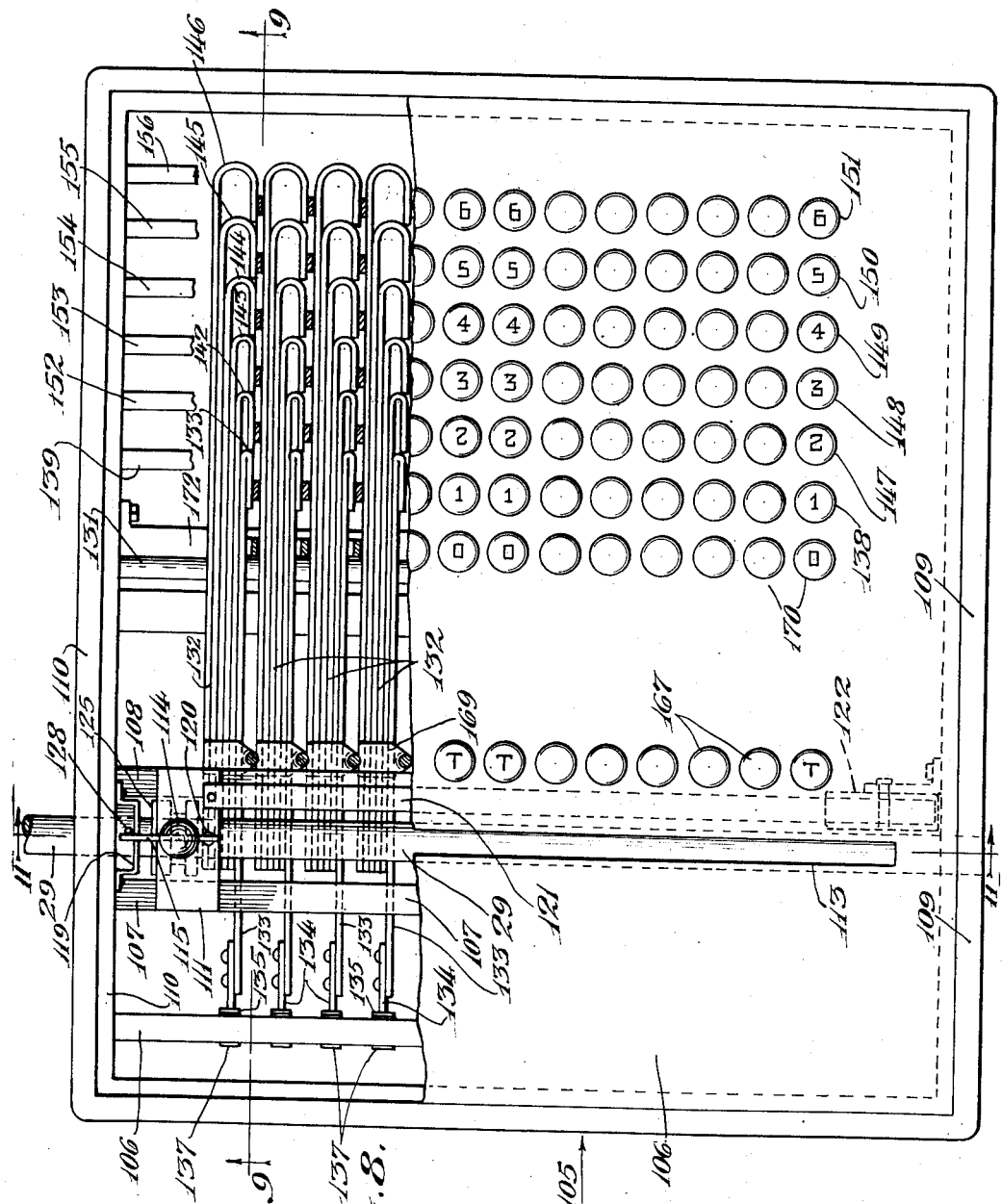
Inventor:
Robert Alonzo Williams
By Zabel, Carlson, Gritzbaugh & Wells
Attorneys Oct. 27, 1942.　　　R. A. WILLIAMS　　　2,300,029
SORTING DEVICE FOR DUPLICATING MACHINES
Filed June 19, 1941　　　9 Sheets-Sheet 6
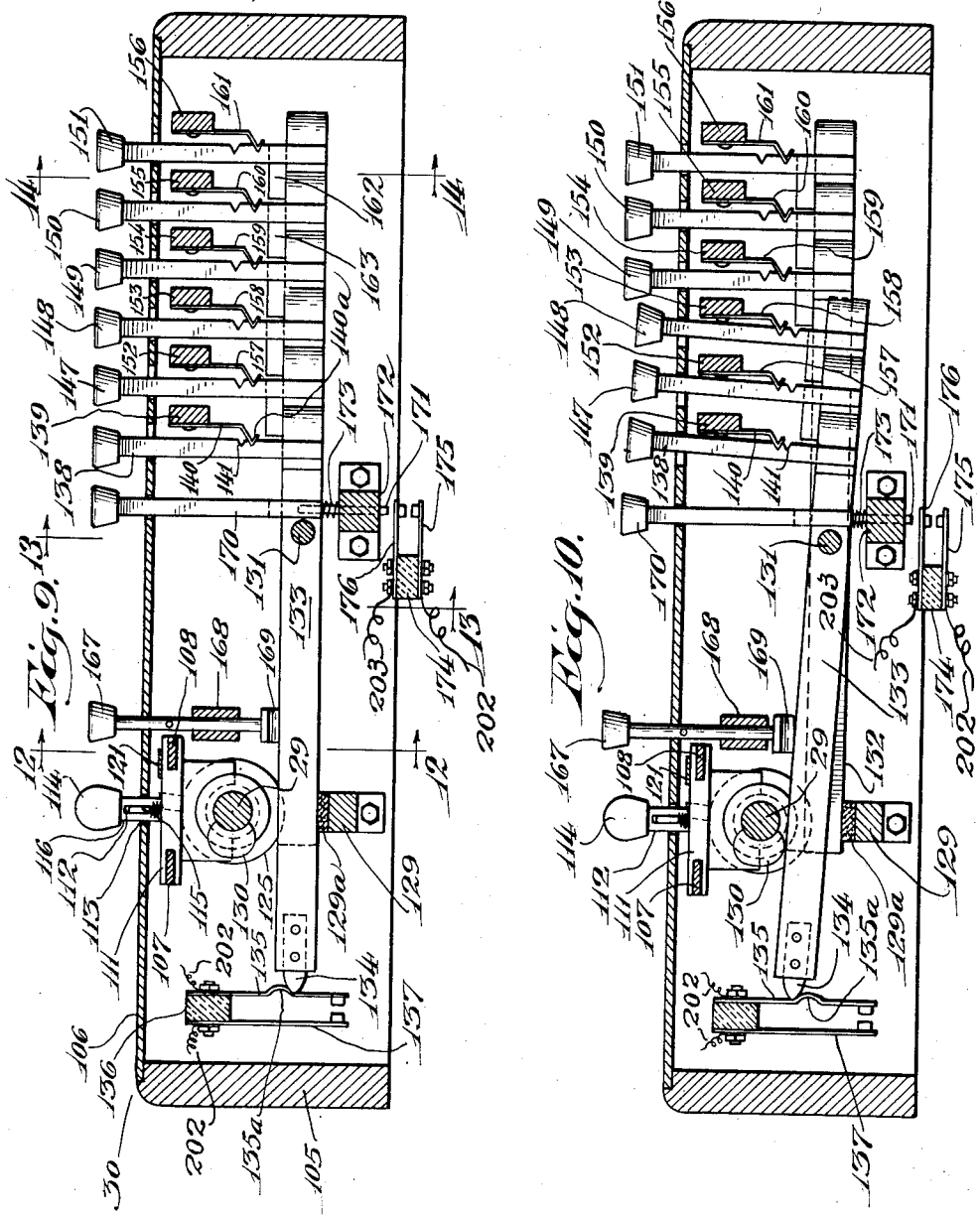
Inventor
Robert Alonzo Williams
By Zabel, Carlson, Gritzbaugh & Wells
Attorneys Oct. 27, 1942.   R. A. WILLIAMS   2,300,029
SORTING DEVICE FOR DUPLICATING MACHINES
Filed June 19, 1941   9 Sheets-Sheet 7
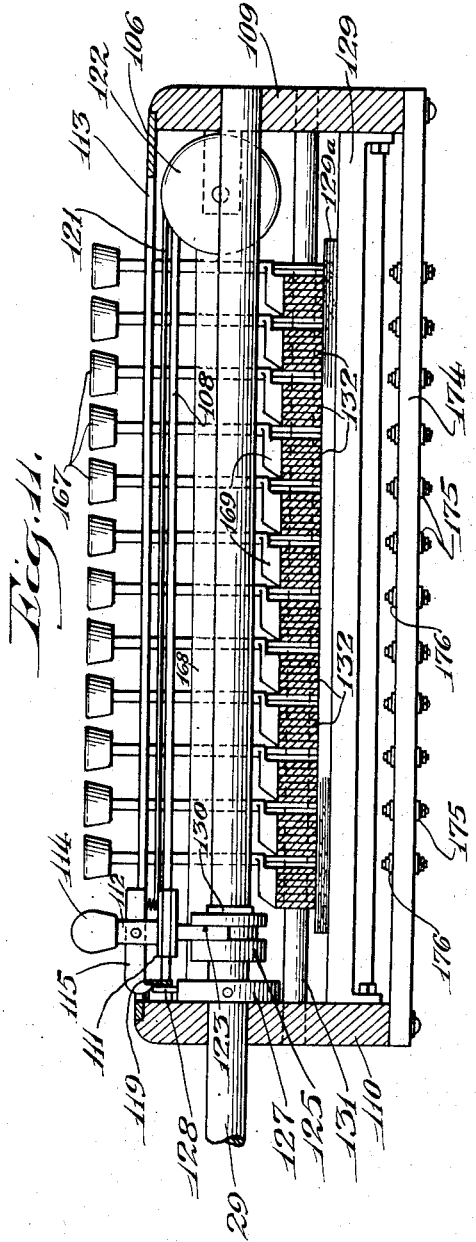
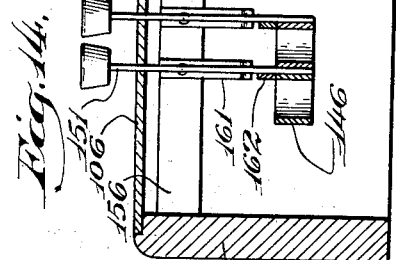
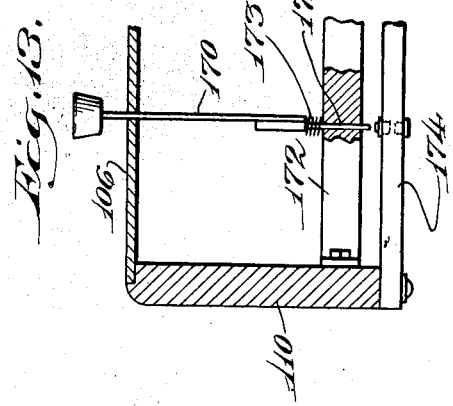
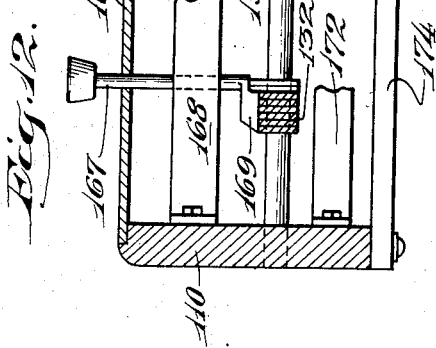
Inventor:
Robert Alonzo Williams
By Zabel, Carlson, Gritzbaugh & Wells
Attorneys.

Oct. 27, 1942.   R. A. WILLIAMS   2,300,029
SORTING DEVICE FOR DUPLICATING MACHINES
Filed June 19, 1941   9 Sheets-Sheet 8
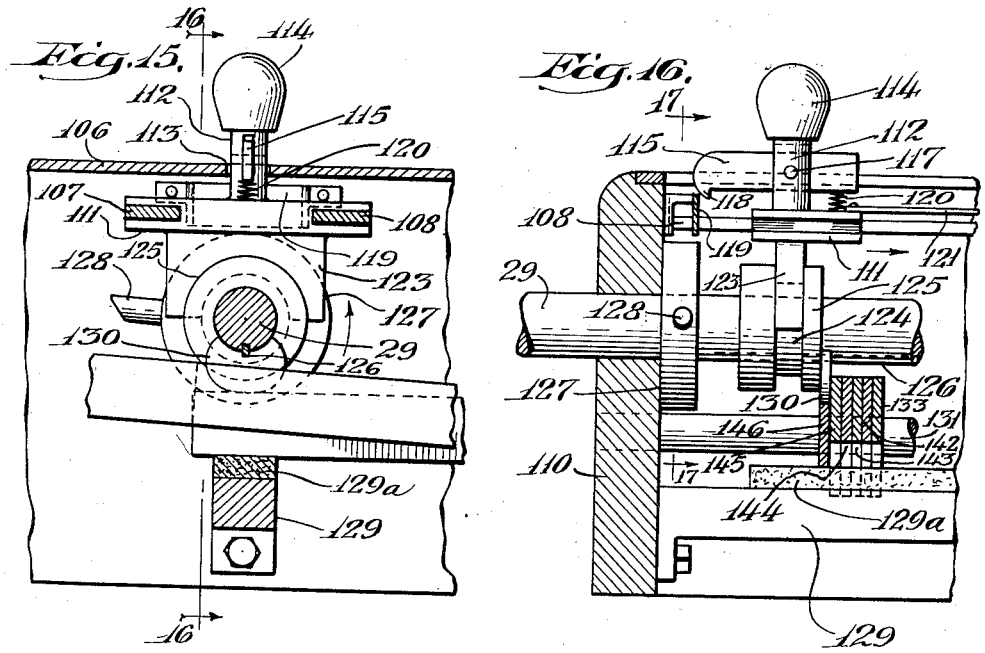
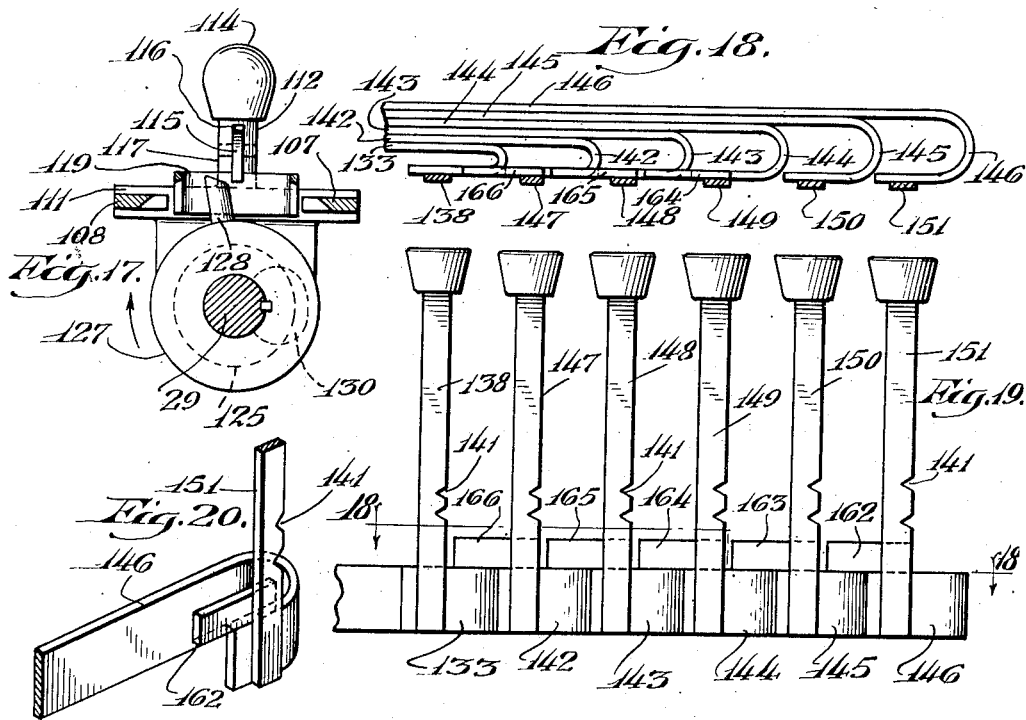
Inventor
Robert Alonzo Williams
By Zabel, Carlson, Gritzbaugh & Wells
Attorneys

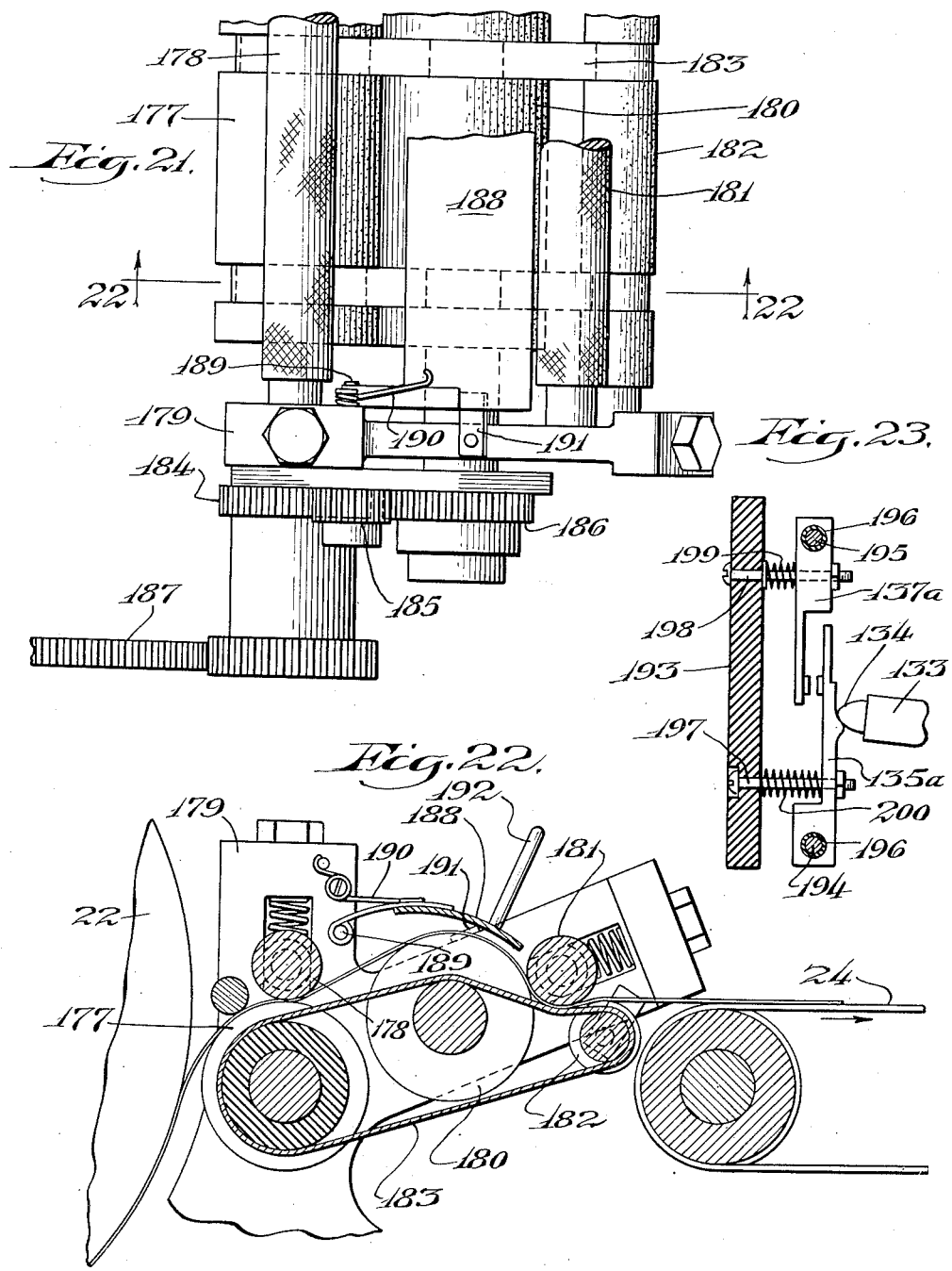

Patented Oct. 27, 1942

2,300,029

UNITED STATES PATENT OFFICE 2,300,029

SORTING DEVICE FOR DUPLICATING MACHINES

Robert Alonzo Williams, Chicago, Ill., assignor to Ditto, Incorporated, Chicago, Ill., a corporation of West Virginia Application June 19, 1941, Serial No. 398,799

25 Claims. (Cl. 93—93)

This invention relates to sorting devices and more particularly to a sorting attachment for duplicating machines.

In the use of duplicating machines whereby information obtained from a master record is printed upon a plurality of copy sheets it is often desirable to segregate the copy sheets into groups which may be variable both as to the number of groups and as to the number of copy sheets in individual groups. For example, in connection with a given record it may be desirable to make say twenty-five copies for the use of different departments of a business. These copies are distributed among different departments. Some departments may get six or eight copies while other departments may get only one or two or three copies.

One form of the invention is embodied in a machine wherein a duplicating drum delivers copies onto a conveyor that in turn transmits the copies to a series of pockets. Each pocket has an opening at the top and this opening is controlled by means of a gate that is closed after the desired number of copies have been deposited in the particular pocket. Means are provided whereby the operator of the duplicating machine may predetermine the number of copies that will go in any individual pocket, whereupon the copies may be made by the duplicating machine and after each pocket receives the desired number of copies the gate thereof will be closed and copies will be delivered to the next succeeding pocket until each pocket has the desired number of copies therein.

It is the principal purpose of this invention to provide a sorting device of the character described in combination with a duplicating machine whereby after the preselection of the desired number of copies in each pocket has been made the mere operation of the duplicating machine in the usual fashion will result in the copies being deposited according to the selection in the several pockets.

It is a further purpose of the present invention to provide a novel sorting device of the character described whereby the several copies as deposited in the pockets may be moved laterally edgewise so as to be readily available for separate removal from the particular pockets.

Other and more detailed objects and advantages of the invention will appear from the following description, reference being had to the accompanying drawings wherein a preferred form of the invention is shown.

In the drawings:

Fig. 2 is a plan view of the machine;

Fig. 3 is a slightly enlarged fragmentary sectional view of the machine taken on the line 3—3 of Fig. 2;

Fig. 4 is a fragmentary view in perspective of a portion of the pocket mechanism embodied in the machine;

Fig. 5 is a sectional view taken on the line 5—5 of Fig. 3;

Fig. 6 is an enlarged fragmentary view illustrating a portion of the operating mechanism for the gates that are adapted to close the pockets in the sorting device;

Fig. 7 is a sectional view taken on the line 7—7 of Fig. 6;

Fig. 8 is a plan view illustrating the selecting device, a part of the cover being broken away to better illustrate the mechanism;

Fig. 9 is a sectional view on the line 9—9 of Fig. 8;

Fig. 10 is a sectional view similar to Fig. 9 showing a changed position of the parts;

Fig. 11 is a sectional view taken on the line 11—11 of Fig. 8;

Fig. 12 is a sectional view taken on the line 12—12 of Fig. 9;

Fig. 13 is a sectional view taken on the line 13—13 of Fig. 9;

Fig. 14 is a sectional view taken on the line 14—14 of Fig. 9;

Fig. 15 is an enlarged fragmentary sectional view taken on the line 9—9 of Fig. 8;

Fig. 16 is a sectional view taken on the line 16—16 of Fig. 15;

Fig. 17 is a fragmentary sectional view taken on the line 17—17 of Fig. 16;

Fig. 18 is a fragmentary plan section taken on the line 18—18 of Fig. 19;

Fig. 19 is a fragmentary view in side elevation of one of the selecting units forming a part of the mechanism shown in Fig. 8;

Fig. 20 is a fragmentary perspective view illustrating the end construction of one of the bars of a selecting unit;

Fig. 21 is an enlarged fragmentary plan view illustrating part of the means for delivering sheets from the duplicating drum to the sorter;

Fig. 22 is a sectional view taken on the line 22—22 of Fig. 21; and

Fig. 23 is an enlarged sectional view of a desired form of contact mounting used in the selecting mechanism.

Figure 1:
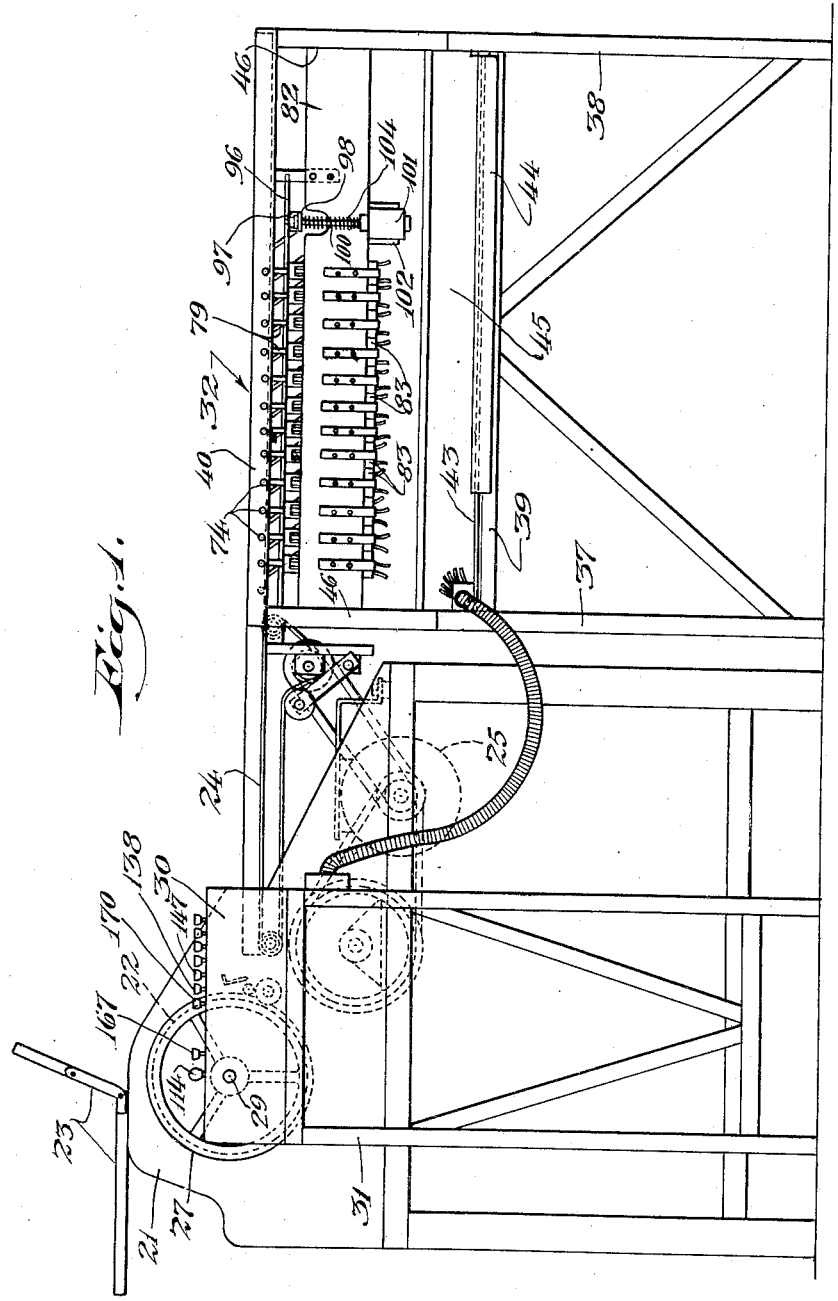
Fig. 1 is a view in side elevation of a machine embodying the present invention.

Referring now in detail to the drawings, the present invention is embodied in a machine for producing and segregating a number of imprinted copies that are made by a duplicating machine of a known type. Referring particularly to Figs. 1, 2 and 3, the machine embodies a duplicating apparatus comprising a framework 21 upon which a duplicating drum 22 is mounted, the duplicating drum being adapted to receive copy sheets from a feed tray 23 and deliver said copy sheets to a conveyor 24. The duplicating machine and the conveyor 24 are driven by a motor 25 which is carried by the frame 21.

The duplicating drum 22 has one end of its shaft 26 extended beyond the frame 21 where it is provided with a hand wheel 27. A clutch mechanism 28 connects the shaft 26 to a drive shaft 29 (see Fig. 8) of a selecting device 30. The selecting device 30 is supported upon a stand 31.

Adjacent the delivery end of the conveyor 24 there is provided a stand 32 that carries a multiplicity of pockets 33 and 34. It will be noted from an inspection of Fig. 3 that the first pocket 33 is elongated. The purpose of this will be brought out more fully hereinafter. All of the pockets are arranged so as to slope downwardly in a direction away from the conveyor 24, and the entrance to each pocket is guarded by a gate. A gate 35 guards the entrance to pocket 33 while gates 36, all of similar construction, guard the entrances to the several pockets 34. The several pockets described are composed of an upper portion that is relatively stationary with respect to the stand and a bottom portion that is movable laterally edgewise of the pockets so as to carry the sheets deposited in the pockets laterally with respect to the stand to enable them to be picked out without any difficulty.

The stand 32 comprises end uprights 37 and 38, there being two uprights at each end of the stand. The uprights are connected longitudinally of the machine by two angle irons 39 intermediate the ends of the uprights and two angle irons 40 at the upper ends of the uprights. The angle irons 40 extend beyond the stand 32 toward the duplicating apparatus and serve as means for supporting the conveyor 24. Two transversely running angle irons 41 and 42 are provided at the ends of the stand 32. The angle iron 41 connects the uprights 37 while the angle iron 42 connects the uprights 38. A plate 43 is laid on the angle irons 41 and 42. As a means of reinforcing the plate 43 there is provided along one longitudinal edge thereof an angle iron 44 (see Figs. 1 and 5). The several angle irons and parts of the stand 32 are welded or otherwise rigidly secured together in accordance with common practice in constructing frameworks of this character. An upright panel 45 is provided between the angle irons 40 and 44, this panel serving as a supporting means for a framework 46 and control mechanism carried by this framework.

Upon the plate 43 (see Fig. 3) there are provided two rails 47 and 48, these rails being placed transversely of the stand 32 directly beneath the bottom portion of the assembly of pockets 33 and 34. The bottom portion of the pocket assembly comprises a casting 49 preferably made of some light weight metal such as aluminum. This casting is provided with two depending bosses 50 over the rail 48 and two depending bosses 51 over the rail 47. The bosses 50 and 51 have rollers 52 and 53 journaled therein and are provided with grooves 54 and 55 in their upper surfaces to receive said rollers 52 and 53.

The pocket assembly includes a back plate 56 secured to the casting 49 along one side edge of the casting (see Fig. 5) and a multiplicity of obliquely positioned strips 57. The strips 57 are secured along their lower edges to the casting 49, the casting being corrugated so as to provide surfaces 58 (see Fig. 4) to which the strips 57 are secured and to provide other surfaces 59 on which the delivered sheets come to rest in the pocket. The several strips 57 have their upper edges received between the lower extremities of a multiplicity of folded sheets 60 which also form part of the pocket assembly. The sheets 60 are U-shaped in cross section as illustrated clearly in Fig. 3 and are carried on horizontally extending pins 61 and 62 that are provided upon two supporting bars 63 and 64 attached to the under sides of the angle irons 40. The pins 61 and 62 are relatively short but they serve to fix the U-shaped sheets 60 in position at their upper ends.

Within each pocket there is provided a guide strip 65 which hooks over the top of the corresponding U-shaped sheet 60 so as to be frictionally held in place, and the lower portion of the guide strip 65 is bent toward the next adjacent sheet 60 so as to force sheets falling into the pocket toward the upper sloping walls of the pocket. By guiding the incoming sheet toward the upper sloping wall of the pocket I am able to prevent the edges of the sheets from catching on sheets that have already been deposited in the pockets and thus avoid clogging of any particular pocket.

It is believed to be clear from the foregoing description that the sheets 60 and their associated guide strips are relatively stationary within the stand 32 but they may be lifted up and removed any time. However the bottom casting 49 and its associated strips 57 are movable transversely of the stand along the rails 47 and 48. A door 66 is hinged to the stand 32 by means of a hinge pin 67 (see Fig. 5) extending lengthwise of the stand 32 just above the plate 43 at the edge thereof opposite the angle iron 44. The door is provided with two arcuate slotted arms 68 and 69 (see Figs. 3 and 5). These arms 68 and 69 are slotted to receive studs 70 and 71 on the adjacent uprights 37 and 38. The function of the arms 68 and 69 is to insure adequate support of the door 66 when it is lowered into horizontal position as shown in Fig. 5. The door 66 is provided with two tracks 72 and 73 comprising pairs of bars (Fig. 3) in line with the rails 47 and 48, respectively. When the door 66 is lowered into horizontal position the operator may pull the bottom portion of the pocket assembly horizontally out of the stand as is indicated in dotted lines in Fig. 5, the rollers 52 and 53 being guided and supported by the tracks on the door. It will be noted that although the strips 57 extend up into overlapping engagement with the U-shaped sheets 60 the longitudinal back plate 56 terminates below the lower edges of the sheets 60.

The portion 33 of the pocket assembly is shown as being somewhat deeper than the others merely to illustrate the provision for longer sheets. It is obvious of course that the length of sheet that may be received in the pocket 33 is substantially greater than the length of sheet that may be received in the other pockets.

Referring now to the several gates 35 and 36, these gates comprise strips of metal bent around and fastened to individual operating shafts 74.

The shafts 74 for the several gates 36 extend through the angle irons 40 and also have bearings in an angle iron 75 which is a top member of the framework 46. Between the angle iron 75 and the adjacent angle iron 40 each one of said extended shafts 74 is provided with a lever arm 76 (see Fig. 6). The lever arm 76 has a slot 77 extending in from its free end toward the shaft 74. The lever arm is also bifurcated by a vertically running slot 78 (see Fig. 7). A solenoid stem 79 has a flattened upper end 80 that fits in the slot 78 of each lever arm 76. The flattened end portion 80 is provided with a pin 81 that rides in the slot 77 of the lever arm 76. It will be evident that by lowering the solenoid stem 79 the lever arm 76 may be caused to turn the shaft 74 and thus close the associated gate 36.

Means are provided whereby lowering of the solenoid stem 79 will result in its being locked in lowered position.

The frame 46 carries a mounting plate 82 upon which a number of solenoids 83 for operating the stems 79 are carried. At the upper edge of the mounting plate 82 there is provided a narrow mounting strip 84 to which spring housings 85 for the several stems 79 are secured. Within the housings 85 I locate springs 86 that are under compression between the cup-shaped bases 87 of the housings and collars 88 fixed on the stems 79. The springs 86 tend to move the stems 79 upwardly at all times so that when the solenoids 83 are de-energized the stems, unless latched down, will rise and open the pocket gates 35 and 36 associated therewith. Each of the housings 85 carries a latching mechanism, which mechanisms are adapted to latch the stems 79 in lowered position when they have been attracted downwardly by the solenoids 83 against the force of the springs 86.

The latching mechanism just referred to comprises a latch plate 89 that is apertured to receive the stem 79. The plate 89 is pivoted in a flange 90 that forms a part of the cap 91 of the housing 85. The cap 91 is of course apertured to pass the stem 79. For effecting the pivotal mounting of the plate 89, the flange 90 has a slot 92 therein through which a reduced end portion 93 of the latch plate 89 extends. The slot is large enough to permit the reduced end 93 to pivot loosely therein. A spring 94 (see Fig. 7) is interposed between the plate 89 and the cap 91 and is under compression so that it tends to urge the plate 89 upwardly. The stem 79 has an annular groove 95 adjacent the flattened portion 80 thereof and this groove is rounded so that the latch plate 89 will releasably engage in it and hold the stem 79 in lowered position. The stem however can be released by pressing down on the free end of the latch plate 89 against the force of the spring 94 so as to snap the plate out of the groove 95.

In order to release the several latch plates 89 at the end of a particular operation so as to cause the several stems 79 to be raised by their associated springs 86 to effect opening of the several gates 35 and 36, I provide a solenoid operated control mechanism. This control mechanism and the solenoid are shown best in Figs. 6 and 7. A bar 96 is pivotally supported in the frame 46 in such position that if it is rocked in a counterclockwise direction as illustrated in Fig. 7 it will engage the several latch plates 89 and push them downwardly. The bar 96 has a depending lug 97 thereon to which is attached an actuating arm 98. The arm 98 has its free end 99 apertured to loosely receive a stem 100 of a solenoid 101, the solenoid 101 being supported from the plate 82 by means of a strap 102 that extends below the plate 82 and is fastened to the housing of the solenoid. The stem 100 has a collar 103 affixed to the upper end thereof to engage the arm 98. A spring 104 is interposed between the arm 98 and the top of the solenoid housing and is under compression so as to force the arm 98 against the collar 103. When it is desired to cause the bar 96 to unlatch the several latch plates 89 the solenoid 101 is energized so as to draw down its stem 100 and cause the arm 98 to rock the bar 96 in a counterclockwise direction as shown in Fig. 7 into engagement with the latch plates 89. When the latch plates 89 are forced downwardly by the bar 96 they release the stems 79 so as to permit them to rise under the force of the springs 86.

The several solenoids 83 and 101 are controlled by means of the selecting device 30. The details of the selecting device 30 are shown in Figs. 8 to 20, inclusive, of the drawings. The selecting device comprises a rectangular framework 105 having a cover plate 106. The shaft 29 extends across the framework 105 and is journalled in the two opposite sides thereof. Above the shaft and spaced laterally therefrom, there are two guide bars 107 and 108, the ends of which are affixed to the opposite sides 109 and 110 of the framework 105. A carriage 111 deeply grooved at both end portions is mounted for sliding movement along the bars 107 and 108. The carriage 111 has a stem 112 thereon that projects up through a slot 113 in the cover 106. A handle 114 is provided on the top of the stem 112. The stem also carries a latch 115 (see Fig. 16) which passes through a slot 116 in the stem and which is pivoted in the stem by means of a pivot pin 117 (see Figs. 16 and 17). The latch 115 is provided with a depending portion 118 which is adapted to engage a latch plate 119 that is mounted on the side member 110 of the framework 105. A spring 120 is interposed beneath the end of the latch 115 opposite the depending portion 118 yieldably to hold the latch in position to engage the latch plate 119.

The carriage 111 is drawn toward the right as indicated in Fig. 16 by means of a clock spring 121, the free end of which is secured to the carriage, the spring being coiled in a housing 122 that is mounted on the side frame 109 (see Figs. 8 and 11). The carriage is provided with a saddle 123 that rides in a groove 124 provided in a collar 125. The collar 125 is slidable lengthwise of the shaft 29 but is keyed thereto by means of a key 126 so as to rotate with the shaft. As will be presently explained, the collar 125 is permitted to advance step by step toward the right from the position shown in Figs. 11 and 16 by means of a selecting key arrangement. In order to release the latch 115 so that the carriage 111 may initially move to the right the shaft 29 is provided with a collar 127 having a releasing pin 128 in its periphery. The bars 107 and 108 and the latch plate 119 are cut away as illustrated in Fig. 17 so as to permit the releasing pin 128 to extend up into position to engage the depending portion 118 of the latch 115 and release it from the latch bar 119. The releasing pin 128 turns with the shaft 29 but the latch portion 118 is only in position to be engaged by the pin 128 at the beginning of an operation. After the latch is released the carriage 111 is moved step by step to the right from the position shown in Fig. 11, by the spring 121 under control of the selecting key arrangement.

The selecting key arrangement for controlling the travel of the carriage 111 will now be described. It will be noted that the collar 125 carries a cam 130 which is on the right hand side of the collar 125 in Figs. 11 and 16. A cross bar 129 is located beneath the shaft 29 and carries a yielding pad 129a. A key lever shaft 131 extends parallel to the shaft 29 between the side frames 109 and 110. This key lever shaft serves as a pivot for several banks 132 of key levers that are adapted to be moved by the cam 130. There is a bank of key levers for each of the pockets 33 and 34. The banks may consist of a great or small number of key levers. In the instance shown six key levers are employed in each bank in order that an operator may place up to six copies in each of the pockets, if desired. Each bank of key levers includes one lever 133 which extends beneath the shaft 29 and has a rounded contact engaging element 134 that is in engagement with a movable spring contact 135. The spring contact 135 is mounted upon a bar 136 of insulating material and has a binding post connected therewith so that a conductor from a corresponding solenoid may be connected therewith. The element 134 is of insulating material in order that the spring contact 135 will not be grounded upon the key lever itself. Opposite the spring contact 135 there is another spring contact 137 also mounted on the bar 136 and having a binding post by which it may be connected to a source of current, this connection being effected preferably through the switch controlling the operation of the duplicating machine.

A key 138 is affixed to the key lever 133 and projects up through an opening in the cover 106. A transverse bar 139 (see Fig. 9) extends between the side frames 109 and 110 and carries a spring pawl 140 that is adapted to engage in notches 141 in the key 138. The notches 141 are so spaced that when the tip 140a of the pawl 140 is engaged with the lower notch in the key, the key lever 133 is in the position shown in Fig. 9 with the element 134 below a cam portion 135a on the spring contact 135. However, if the key 138 is depressed to the position shown in Fig. 10 or raised from that position to the position shown in Fig. 9, this causes the element 134 to move along the face of the cam portion 135a and bring the spring contacts 135 and 137 together so as to momentarily close a circuit through the solenoid that is electrically connected therewith, the contacts being adapted to open again at the completion of the movement of the lever. Ordinarily the key 138 is depressed while the motor control switch is open so that the solenoid 83 is not energized on the upward movement of the element 134. When the element 134 later moves downwardly during the operation of the duplicating machine with its control switch closed, the solenoid is energized so as to close the connected gate 36.

Each bank of key levers includes a lever 133 and five additional levers 142, 143, 144, 145 and 146. The several key levers just described are shorter than the key lever 133 in their extension to the left of the shaft 131 as viewed in Figs. 9 and 10. However, each of these levers extends far enough to be beneath the cam 130 on the collar 125. The key levers 142 to 146, inclusive, have thereon keys 147, 148, 149, 150 and 151, respectively. Each of the keys 147 to 151, inclusive, has two notches therein like the notches 141, and corresponding cross bars 152, 153, 154, 155 and 156 carry springs 157, 158, 159, 160 and 161 to engage the notches in the associated keys. The details of assembly of the keys with their key levers is illustrated best in Figs. 18 to 20, inclusive. It will be noted from Figs. 18 to 20 that the key 146 is bent into U-shape at its free end and that the corresponding key 151 is secured by welding to the short end of the U-shaped portion of the key lever. The other key levers 145, 144, 143, 142 and 133 are similarly bent so that the short leg portions of the U-shaped ends of the key levers are all in alignment. The keys 151, 150, 149, 148 and 147 carry lugs 162, 163, 164, 165 and 166. These lugs extend to the left as shown in Figs. 9 and 19 so as to overlie a portion of the adjacent key lever. This makes it possible for the operator, by merely pressing a key 151, to move all of the key levers of that bank from the position shown in Fig. 9 to the position of the three left hand key levers in Fig. 10. However, if a key to the left of the key 151 is depressed this will not depress the key lever associated with the key 151. This arrangement makes it possible for the operator to depress, by a single operation, any desired number of the keys up to six. There are twelve banks of keys as shown, the twelve banks corresponding to the twelve short pockets 34 that receive the copy sheets from the duplicating machine. The long pocket 33 has its gate 35 manually controlled by means of a hand lever 35a (see Fig. 2) and is not under the control of the selecting device.

A trip key 167 is provided for each bank of key levers. These trip keys are mounted in a cross bar 168 (see Fig. 9), and each trip key (see Figs. 11 and 12) has a shoe 169 thereon, which shoe is wide enough to cover all six of the key levers of its associated bank. The function of the trip lever is to enable the operator, after having made a selection by depressing one of the keys directly connected to a key lever, to restore the entire bank of key levers to their normal inoperative position. This effect is normally brought about when the control switch for the duplicating machine is open, so that the closing of the switch 135—137 incidental to these movements of the levers has no effect on the gates 36.

In addition the selecting device carries a set of keys 170 indicated as "0" keys in Fig. 8, the purpose of which is to individually close the several gates 36 for the pockets 34. The keys 170 have reduced extensions 171 of insulating material (see Fig. 13) that extend through a bar 172 mounted in the framework 105, the upper ends of the keys 170 being guided by openings in the cover 106. Springs 173 are coiled about the reduced portions 171 of the keys 170 so as to normally hold these keys in raised position. A cross bar 174 made of insulating material (see Figs. 9 and 10) carries two spring contacts 175 and 176 for each key 170 in position to be closed by said key when the key is depressed. The spring contacts 175 and 176 are connected by suitable circuits to the solenoids 83 so that by closing the contacts 175 and 176 for a particular solenoid that solenoid may be energized and caused to close the gate 36 that is mechanically connected with its stem 79. The circuits for the switches 175—176 are connected with a source of current independently of the switch controlling the duplicating machine so that the solenoids 83 may be energized through the switches 175—176 when the duplicating machine is idle.

In normal use of the selecting device the operator, before starting to make copies with the duplicating machine and with the electrical connections to the solenoids 83 open, will preset the several sets of keys corresponding to the pockets 34. That is, assuming that five copies are desired in the first pocket 34, the operator will press key No. 5 in the bank of keys nearest the duplicating machine, as illustrated in Fig. 2, for raising the operative end of the lever 145 and the levers 144, 143, 142 and 133 with it for elevating the member 134 as shown in Fig. 10, this being done without affecting the gates 36 since the solenoids 83 are not energized. Similarly he will pre-establish the number of copies to be put in each of the twelve pockets by pressing the correspondingly numbered key all the way across the selecting device. If no copies are wanted he will press the "0" key for that particular pocket. Immediately when he presses the "0" key he energizes the solenoid 83 connected with the particular pocket so as to close the gate 36 for that pocket. The latch plate 89 will then hold the gate closed by holding down the solenoid stem even though the solenoid is immediately de-energized by release of the "0" key.

Having established the number of copies desired in each of the pockets 34 the operator is now ready to start the machine and does so in the construction illustrated by throwing a switch for starting the motor 25. This causes the shaft 29 to rotate and operate the selecting mechanism to effect closure of the several gates 36 in turn as the pockets they control receive the number of copies desired.

The first result of rotation of the shaft 29 in the selecting device is the release of the latch 115. The first rotation of the shaft causes the pin 128 to lift the latch from the latch plate 119 and thereafter the spring 121 starts moving the carriage 111 toward the right from the position indicated in Fig. 11. Rotation of the shaft 29 causes rotation of the collar 125. It will be noted from an inspection of Figs. 15 and 16 that if the key levers 133 and 142 to 146, inclusive, are in raised position with respect to the shaft 29 they will permit the collar 125 to go only so far to the right as shown in Fig. 16 as to bring the collar up against the first key lever 146. As the shaft 29 rotates into the position as shown in Figs. 15 and 16, the cam 130 will be brought into engagement with this first key lever and will depress it. The end of the key lever having the key thereon will be raised by this action and the corresponding one of the springs 140 and 157 to 161, inclusive, will engage in the proper notch to hold the key lever in its changed position. After the cam 130 has passed over the key lever the collar 125 will be pulled by the spring 121 and the carriage 111 up against the next key lever of the bank Another rotation of the shaft 29 will depress that key lever and the operation will continue until the key lever 133 of that particular bank is reached. When the key lever 133 is depressed by the cam 130 it moves the element 134 down across the cam surface 135a of the spring contact 135, thus temporarily bringing the spring contact 135 into engagement with the spring contact 137. This energizes the corresponding solenoid 83 long enough to permit it to attract its stem 79 and close the gate 36 mechanically connected to that stem. The latch plate 89 will hold the gate closed when the contact springs 135 and 137 separate.

The operation just described will be repeated for the next bank of key levers and succeeding banks of key levers until the collar 125 has traveled past all of the key levers. This completes one sorting cycle and in order to make another sorting the operator must return the carriage 111 to its starting position so as to cause the latch 115 to hook over the plate 119. The electrical connections are such that when the last key lever 133 is depressed by the cam 130 for carrying the last member 134 downwardly, the solenoid 101 is energized by means comprising a circuit 201 so as to release, by means of the bar 96, all of the latch plates 89 whereby to open all of the gates 36.

It will be understood that the duplicating copies are made by the machine in such manner that a copy has time to travel to a particular pocket before the pocket closes. For example, upon the first copy making rotation of the machine the carriage 111 is released by movement of the pin 128 under the latch tip 118. The first copy is carried forward and deposited in the first pocket 33 while the second copy is being made. The last rotation of the duplicating machine makes an extra copy that is on the conveyor when the final operation energizing the solenoid 101 takes place. If this extra copy is not desired it is avoided by stopping the paper feed to the machine.

No attempt has been made to show the details of the electrical circuit for the solenoids. It is very simple. One lead from a source of current is connected to one terminal of each solenoid coil. This may be a common lead 202 for the solenoids 83 and is preferably one of the leads to the motor 25 so as to include the control switch for the motor therein. Each branch of this common lead 202 has one of the switches 135—137 interposed therein, so that each of the switches 135—137 is in series with the motor control switch. A second lead 203, preferably from the same source of current, is connected to the same terminal of each of the solenoids 83, each branch of said second lead 203 having one of the switches 175—176 interposed therein. The other terminal of each of the solenoids 83 is connected with the opposite side of said source of current by means of a lead 204.

With certain types of paper the sheets, in leaving the drum 22, are apt to become curled by the stripping rolls 177 and 178 to such an extent that their front edges dig down and cause trouble in engaging the pocket gates 35 and 36. In order to overcome this difficulty I provide means (see Figs. 3, 21 and 22) between the drum 22 and the conveyor 24 to straighten out the sheets. This means comprises a framework 179 which carries the stripping rollers 177 and 178 and which also carries a series of straightening rollers 180, 181 and 182. The stripping roller 178 and the straightening roller 181 are knurled metal rollers, while the other rollers 177, 180 and 182 are made of rubber. Belts 183 are trained about reduced sections of the rubber rollers 177, 180 and 182 so as to prevent the copy sheets from passing between these rollers. The roller 180 is driven from the stripping roller 177 by means of a gear train comprising a gear 184 on the stripping roller, an idler gear 185 mounted on the frame 179, and a gear 186 fixed to the roller 180. The roller 177 is driven from the duplicating drum in the usual manner by a gear 187.

The sheet straightening device includes a deflector plate 188 which is pivoted to the frame 179 at 189 and which is spring pressed downward by a spring 190 also mounted on the frame 179. The deflector plate 188 is limited in its downward movement by stops 191 which are mounted on the frame 179. A hold grip 192 is provided on the deflector plate for lifting it out of position at certain times. Normally the straightening mechanism is used for ordinary types of work but when the machine is handling heavier card stock the stripping rollers do not cause enough curvature in the paper to be objectionable and in such case the operator may lift the stripping plate 188 and allow the copy sheets to pass over the rollers 180, 181 and 182 onto the conveyor belt 24.

In Fig. 23 I have shown a desired form of contact mechanism which is normally used for the contacts 135, 137, 175 and 176. This contact mechanism comprises a bar 193 of insulating material and two pivot rods 194 and 195, each having a sleeve 196 thereon of insulating material. The contact arms 135a and 137a are pivoted on the sleeves 196 and are connected to the bar 193 by bolts 197 and 198. Springs 199 and 200 press the contact arms 137a and 135a outwardly away from the bar 193 so that they will be held in open circuit position except when the actuator engages them. The advantage of this construction lies primarily in the fact that it is a rugged yet simple individual mounting for the several contacts that permits of accurate adjustment through the bolts 197 and 198 and the nuts thereon.

While there have been shown and described certain embodiments of the invention, it is to be understood that it is capable of many modifications. Changes therefore may be made without departing from the scope of the invention as described in the appended claims, in which it is the intention to claim all novelty inherent in the invention as broadly as possible, in view of the prior art.

I claim:

1. In a device of the character described, a sheet advancing mechanism, a series of pockets arranged with openings in the path of sheets advanced by said mechanism, gates for closing said pocket openings, means for selectively closing said gates upon receipt of a selected number of sheets therein, and means operable to shift the sheets deposited in said pockets laterally edgewise to extend beyond the pockets whereby they may be removed.

2. In a device of the character described, a sheet advancing mechanism, a series of pockets arranged with openings in the path of sheets advanced by said mechanism, gates for closing said pocket openings, means for selectively closing said gates upon receipt of a selected number of sheets therein, guide strips in each pocket operable to direct the advancing edges of entering sheets past the edge of any sheet already deposited therein, and means operable to shift the sheets deposited in said pockets laterally edgewise to extend beyond the pockets whereby they may be removed.

3. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally shiftable part in each of said pockets for engagement with sheets therein.

4. In a device of the character described, a sheet advancing mechanism, a series of pockets arranged with top openings in the path of sheets advanced by said mechanism, said pockets extending diagonally downward from the top openings, gates for closing said pocket openings, manually adjustable means for selectively closing said gates upon receipt of a selected number of sheets therein, guide strips in each pocket operable to direct the advancing edges of entering sheets past the edge of any sheet already deposited therein, and means operable to shift the sheets deposited in said pockets laterally edgewise to extend beyond the pockets whereby they may be removed, said last named means comprising a laterally shiftable part in each of said pockets and below said guide strips for engagement with sheets therein.

5. The combination with a duplicating machine adapted to imprint desired copy upon copy sheets and discharge said sheets, of a series of pockets in the path of the discharged sheets, conveyor means to advance the discharged sheets to said pockets, gates for said pockets operable when open to direct sheets into their associated pockets, means coupled with and driven by said duplicating machine for controlling the opening and closing of said gates, said means comprising control mechanism individual to the respective gates for said pockets for causing a gate to close after a predetermined number of imprinting cycles of said duplicating machine have occurred.

6. In a device of the character described, a sheet advancing mechanism, a series of pockets arranged with top openings in the path of sheets advanced by said mechanism, gates for closing said pocket openings, means for selectively closing said gates upon receipt of a selected number of sheets therein, and means operable to shift all of the sheets deposited in the several pockets laterally edgewise together to extend beyond the pockets whereby they may be removed.

7. In a device of the character described, a sheet advancing mechanism, a series of pockets arranged to extend diagonally downward from the mechanism with top openings in the path of sheets advanced by said mechanism, gates for closing said pocket openings, means for selectively closing said gates upon receipt of a selected number of sheets therein, guide strips in each pocket operable to direct the advancing edges of entering sheets past the edge of any sheet already deposited therein, and means operable to shift the sheets deposited in said pockets laterally edgewise to extend beyond the pockets whereby they may be removed.

8. In a device of the character described, a sheet advancing mechanism, a series of pockets arranged with openings in the path of sheets advanced by said mechanism, gates for closing said pocket openings, manually adjustable means controlling said gates, comprising a selector having pre-selectable mechanism for selectively closing said gates upon receipt of a selected number of sheets therein, means comprising manually operable keys for closing any one of said gates at any time without disturbing the other gates, and means operable to shift the sheets deposited in said pockets laterally edgewise to extend beyond the pockets whereby they may be removed.

9. In a device of the character described, a sheet advancing mechanism, a series of pockets arranged with openings in the path of sheets advanced by said mechanism, gates for closing said pocket openings, manually adjustable means controlling said gates, comprising a selector having pre-selectable mechanism for selectively closing said gates upon receipt of a selected number of sheets therein, and means comprising manually operable keys for closing any one of said gates at any time without disturbing the other gates.

10. In a device of the character described, a sheet advancing mechanism, a series of pockets arranged with top openings in the path of sheets advanced by said mechanism, gates for closing said pocket openings, means for selectively closing said gates upon receipt of a selected number of sheets therein, guide strips extending into each pocket from the top opening operable to direct the advancing edges of entering sheets past the edge of sheets already deposited therein, and means below the guide strips operable to shift the sheets deposited in said pockets laterally edgewise to extend beyond the pockets whereby they may be removed.

11. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally shiftable bottom section in each of said pockets.

12. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, guide strips in each pocket operable to direct the advancing edges of entering sheets past the edge of any sheet already deposited therein, and means operable to shift the sheets deposited in said pockets laterally edgewise to extend beyond the pockets whereby they may be removed, said last named means comprising a laterally shiftable bottom in each of said pockets.

13. The combination with a duplicating machine adapted to imprint desired copy upon copy sheets and discharge said sheets, of a series of pockets in the path of the discharged sheets, means to advance the discharged sheets to said pockets, gates for said pockets operable when open to direct sheets into their associated pockets, manually adjustable means coupled with and driven by said duplicating machine for controlling the opening and closing of said gates, said manually adjustable means comprising control mechanism individual to the respective gates for said pockets for causing a gate to close after a predetermined number of imprinting cycles of said duplicating machine have occurred, and means automatically operable upon the closing of the last gate to open all the gates.

14. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally shiftable bottom section in each of said pockets, said several bottom sections being connected together.

15. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, means operable to shift the sheets deposited in said pockets laterally edgewise to extend beyond the pockets whereby they may be removed, said last named means comprising a laterally shiftable bottom section in each of said pockets, said several bottom sections being connected together, and a track beneath said connected sections guiding and supporting them in their lateral movement.

16. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally shiftable bottom section in each of said pockets, said bottom sections being provided with upwardly extending side walls and an end wall, the pockets having side walls with channels receiving the side walls of the bottom sections.

17. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally shiftable bottom section in each of said pockets, said bottom sections being provided with upwardly extending side walls and an end wall, the pockets having side walls with channels receiving the side walls of the bottom sections, the end wall of said bottom sections being of less height than the side walls so that it may pass under the channelled pocket walls.

18. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally movable bottom section for said pockets, a track and rollers on said bottom section riding on the track.

19. In a device of the character described, a sheet advancing mechanism, a series of pockets arranged with openings in the path of sheets advanced by said mechanism, gates for closing said pocket openings, manually adjustable means for selectively closing said gates upon receipt of a selected number of sheets therein, and means operable to shift the sheets deposited in said pockets laterally edgewise to extend beyond the pockets whereby they may be removed, said last named means comprising a laterally movable bottom section for said pockets, a track, and rollers on said bottom section riding on the track, a door at one side of said pockets, means to support said door in horizontal position level with the track, and guide means on said door for guiding said rollers.

20. The combination with a duplicating machine adapted to imprint desired copy upon copy sheets and discharge said sheets, of a series of pockets in the path of the discharged sheets, conveyor means to advance the discharged sheets to said pockets, gates for said pockets operable when open to direct sheets into their associated pockets, manually adjustable means coupled with and driven by said duplicating machine for controlling the opening and closing of said gates, said manually adjustable means comprising control mechanism individual to the respective gates for said pockets for causing a gate to close after a predetermined number of imprinting cycles of said duplicating machine have occurred, a key selector having a series of key levers for each pocket, each series including counting levers and a gate closing lever, keys on said levers for manually setting them, a shaft connected to the duplicating machine to rotate once for each imprinting cycle of the machine, and cam means on said shaft for successively engaging and displacing said levers from set position.

21. The combination with a duplicating machine adapted to imprint desired copy upon copy sheets and discharge said sheets, of a series of pockets in the path of the discharged sheets, conveyor means to advance the discharged sheets to said pockets, gates for said pockets operable when open to direct sheets into their associated pockets, manually adjustable means coupled with and driven by said duplicating machine for controlling the opening and closing of said gates, said manually adjustable means comprising control mechanism individual to the respective gates for said pockets for causing a gate to close after a predetermined number of imprinting cycles of said duplicating machine have occurred, a key selector having a series of key levers for each pocket, each series including counting levers and a gate closing lever, keys on said levers for manually setting them, means actuated by the duplicating machine for moving said levers from set position, and gate operating solenoids controlled by the gate closing levers whereby movement of said levers from set position operates the solenoids.

22. In a collecting device for collecting sheet copies, a framework, a series of pockets mounted in the framework, a gate for each pocket, and means to control the positions of said gates, said means comprising lever arms for said gates, a solenoid having a stem connected to each lever arm, means urging the stems against attraction of said solenoids, and latch means for holding the levers in attracted position when the solenoids are de-energized after attracting their stems.

23. In a collecting device for collecting sheet copies, a framework, a series of pockets mounted in the framework, a gate for each pocket, and means to control the positions of said gates, said means comprising lever arms for said gates, a solenoid having a stem connected to each lever arm, means urging the stems against attraction of said solenoids, latch means for holding the levers in attracted position when the solenoids are de-energized after attracting their stems, a latch release plate common to all said latches, and a solenoid connected to said plate.

24. The combination with a duplicating machine having a drum and stripping rollers for stripping a copy sheet from the drum, a series of pockets adapted to receive the sheets, gates for said pockets, means to open and close said gates, a conveyor carrying the sheets to said pockets, and sheet straightening and directing mechanism interposed between the stripping rollers and the conveyor operable to bend the sheets in a reverse direction to the bending thereof by the stripping rollers and then deliver them to the conveyor.

25. The combination with a duplicating machine having a drum and stripping rollers for stripping a copy sheet from the drum, a series of pockets adapted to receive the sheets, gates for said pockets, means to open and close said gates, a conveyor carrying the sheets to said pockets, and sheet straightening and directing mechanism interposed between the stripping rollers and the conveyor operable to bend the sheets in a reverse direction to the bending thereof by the stripping rollers and then deliver them to the conveyor, said straightening and directing mechanism comprising a roller receiving the sheets from the stripping rollers, a deflector plate adjacent said roller for directing sheets about it, a second roller adjacent to the first named roller for engaging the side of a copy sheet opposite that engaged by the first named roller, and means for causing a sheet to bend about a portion of the surface of said second roller to thereby straighten the sheet.

ROBERT ALONZO WILLIAMS.